(12) United States Patent
Krasselt-Cachaj

(10) Patent No.: US 12,065,768 B2
(45) Date of Patent: Aug. 20, 2024

(54) PROTECTIVE COVER FOR A MOTOR VEHICLE BODY

(71) Applicant: Dr. Ing. h.c. F. Porsche Aktiengesellschaft, Stuttgart (DE)

(72) Inventor: Marc Krasselt-Cachaj, Wimsheim (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 17/530,570

(22) Filed: Nov. 19, 2021

(65) Prior Publication Data

US 2022/0235497 A1 Jul. 28, 2022

(30) Foreign Application Priority Data

Jan. 28, 2021 (DE) ...................... 10 2021 101 908.7

(51) Int. Cl.
*B32B 17/06* (2006.01)
*B32B 5/02* (2006.01)
*B32B 7/12* (2006.01)
*B32B 15/14* (2006.01)
*B32B 15/20* (2006.01)
*B32B 27/08* (2006.01)
*B32B 27/12* (2006.01)
*D03D 15/25* (2021.01)

(52) U.S. Cl.
CPC ............ *D03D 15/25* (2021.01); *B32B 5/024* (2013.01); *B32B 7/12* (2013.01); *B32B 15/14* (2013.01); *B32B 15/20* (2013.01); *B32B 17/061* (2013.01); *B32B 27/08* (2013.01); *B32B 27/12* (2013.01); *B32B 2255/06* (2013.01); *B32B 2255/20* (2013.01); *B32B 2307/3065* (2013.01); *B32B 2311/24* (2013.01)

(58) Field of Classification Search
CPC .......... B32B 15/14; B32B 1/02; B32B 5/024; B32B 17/061; B32B 27/30; B32B 27/308; B32B 2262/101; B32B 2305/188; B32B 2307/306; B32B 2307/3065; B32B 15/20; B32B 7/027; B32B 2250/03; B32B 27/12; B32B 2255/205; D03D 15/267; D03D 15/513
USPC .............................. 428/34.1–36.92
See application file for complete search history.

(56) References Cited

U.S. PATENT DOCUMENTS 3,770,480 A * 11/1973 Farnam ............... F16J 15/104
427/428.15
4,509,559 A * 4/1985 Cheetham ................ E04B 1/94
428/921
4,582,156 A * 4/1986 Kochy ................... B62D 65/14
296/72

(Continued)

FOREIGN PATENT DOCUMENTS

CN 101903167 * 12/2010 ............ B32B 17/02
DE 102013216778 A1 2/2015
(Continued)

*Primary Examiner* — Michael C Romanowski
(74) *Attorney, Agent, or Firm* — Buchanan Ingersoll & Rooney PC

(57) ABSTRACT

A protective cover for a motor vehicle body has a main body with a first coating and a second coating. The main body is formed from a flame-retardant fabric. The first coating is an adhesive layer and the second coating is a metal layer.

9 Claims, 1 Drawing Sheet

(56) References Cited

U.S. PATENT DOCUMENTS

| | | | |
|---|---|---|---|
| 4,803,105 A * | 2/1989 | Kretow | B32B 15/14 442/232 |
| 5,836,048 A | 11/1998 | Rossman et al. | |
| 5,955,113 A * | 9/1999 | Jacino | B29C 73/10 29/402.09 |
| 6,001,437 A * | 12/1999 | Thorpe | C03C 25/66 428/36.1 |
| 8,039,077 B2 * | 10/2011 | Miller | B32B 17/04 428/68 |
| 9,023,444 B2 * | 5/2015 | Tigerfeldt | F16L 59/029 156/60 |
| 10,300,675 B2 * | 5/2019 | Wusk | B32B 15/04 |
| 10,828,841 B2 | 11/2020 | Niemeyer et al. | |
| 10,946,629 B2 * | 3/2021 | Meyer | B32B 27/306 |
| 11,845,887 B2 * | 12/2023 | Meyer | B32B 7/12 |
| 2003/0184988 A1 * | 10/2003 | Boyd | H01H 85/2045 361/833 |
| 2003/0198806 A1 | 10/2003 | Samson-Himmelstjerna et al. | |
| 2004/0234753 A1 * | 11/2004 | Husemann | C08K 3/32 428/343 |
| 2004/0235379 A1 * | 11/2004 | Ahluwalia | B32B 15/20 442/59 |
| 2007/0014984 A1 * | 1/2007 | Stout | B32B 27/08 428/353 |
| 2007/0029309 A1 * | 2/2007 | Keite-Telgenbuscher | C09J 133/06 219/549 |
| 2007/0264456 A1 * | 11/2007 | Hood | B29C 73/10 428/41.5 |
| 2008/0099944 A1 | 5/2008 | Lipprandt et al. | |
| 2008/0261012 A1 * | 10/2008 | Kopf | B32B 15/14 428/222 |
| 2008/0286568 A1 * | 11/2008 | Kopf | C09J 7/29 428/336 |
| 2009/0155584 A1 * | 6/2009 | Rolland | B32B 27/306 428/339 |
| 2010/0027920 A1 * | 2/2010 | Raidl | B32B 1/00 428/36.1 |
| 2010/0148127 A1 * | 6/2010 | Ellinger | C09J 123/142 526/348 |
| 2012/0088050 A1 * | 4/2012 | Lavature | B32B 15/14 428/40.9 |
| 2012/0258247 A1 * | 10/2012 | Niwa | C09J 139/04 526/260 |
| 2012/0279637 A1 * | 11/2012 | Siebert | C09J 7/21 156/185 |
| 2013/0017746 A1 * | 1/2013 | Auktun | C09J 7/21 8/675 |
| 2013/0244519 A1 * | 9/2013 | Mu | B32B 27/34 442/136 |
| 2014/0248486 A1 * | 9/2014 | Sin | E04B 1/78 428/221 |
| 2014/0315016 A1 * | 10/2014 | Dollase | C09J 153/00 428/339 |
| 2015/0202844 A1 * | 7/2015 | Boger | B32B 15/20 156/308.2 |
| 2016/0079025 A1 * | 3/2016 | Spesser | H02J 7/0042 320/109 |
| 2016/0200075 A1 * | 7/2016 | Dietze | C09J 113/00 428/63 |
| 2016/0271866 A1 * | 9/2016 | Niemeyer | B29C 65/48 |
| 2016/0347029 A1 * | 12/2016 | Roemer | B32B 27/08 |
| 2017/0365824 A1 * | 12/2017 | Berger | B32B 27/12 |
| 2018/0266591 A1 * | 9/2018 | Mueller | B32B 15/20 |
| 2019/0085153 A1 | 3/2019 | Mussig et al. | |
| 2020/0048503 A1 * | 2/2020 | Kathal | B32B 7/04 |
| 2020/0079031 A1 * | 3/2020 | Sellin | C09J 7/26 |
| 2020/0315072 A1 * | 10/2020 | Howland | B32B 15/20 |
| 2021/0002439 A1 * | 1/2021 | Spencer | C08J 5/244 |
| 2021/0013460 A1 * | 1/2021 | Ootsuki | B32B 27/285 |
| 2021/0054241 A1 * | 2/2021 | Kornacki | B32B 25/08 |
| 2021/0316177 A1 * | 10/2021 | Ahlers | F16L 5/04 |
| 2022/0025220 A1 * | 1/2022 | Meyer | B32B 5/024 |
| 2022/0105708 A1 * | 4/2022 | Meyer | C09J 7/385 |
| 2023/0002960 A1 * | 1/2023 | Brockway | B32B 27/36 |

FOREIGN PATENT DOCUMENTS

| | | | | |
|---|---|---|---|---|
| DE | 102013223504 A1 | 5/2015 | | |
| DE | 102019101494 A1 | 7/2020 | | |
| EP | 0471923 A2 * | 5/1991 | | B29C 73/10 |
| EP | 1315781 A1 | 6/2003 | | |
| EP | 1889715 A1 | 2/2008 | | |
| JP | 2014224648 A * | 12/2014 | | B32B 15/14 |
| WO | 2010057478 A2 | 5/2010 | | |

* cited by examiner

PROTECTIVE COVER FOR A MOTOR VEHICLE BODY

CROSS-REFERENCE TO RELATED APPLICATION

This application claims priority to German Patent Application No. 10 2021 101 908.7, filed Jan. 28, 2021, the content of such application being incorporated by reference herein in its entirety.

FIELD OF THE INVENTION

The present invention relates to a protective cover for a motor vehicle body. Protective covers are used predominantly on the inside of the motor vehicle body. They are likewise also utilized in a front or rear region of the motor vehicle body.

BACKGROUND OF THE INVENTION

DE 10 2013 223 504 A1, which is incorporated by reference herein, discloses an adhesive tape in water-resistant and flame-retardant form. The adhesive tape is based on a modified polylactic acid, and is used for bundling and securing of cables.

EP 1 315 781 B1, which is incorporated by reference herein, likewise discloses an adhesive tape that serves for wrapping of cables, being wound around the cables in spiral form. A carrier of the adhesive tape consists of a nonwoven having an acrylate system on one side that is utilized as adhesive and is applied in strips. For flame retardancy, red phosphorus, organophosphorus, mineral or intumescent compounds of ammonium polyphosphate together with synergists such as antimony trioxide are added to the nonwoven or to the acrylate system.

WO 2010/057478 A2, which is incorporated by reference herein, discloses a flexible composite system consisting of a fabric layer, carbon fibers and a resin which bonds the fabric layer to the carbon fibers, and which maintains the flexibility of the composite system. After curing, an adhesive is applied to the composite system beneath the fabric layer. The composite system is used for the lining of motor vehicle bodies.

SUMMARY OF THE INVENTION

Described herein is an improved protective cover for a motor vehicle body.

A protective cover of the invention for a motor vehicle body has a main body having a first coating and a second coating. According to the invention, the main body is formed from a flame-retardant fabric, wherein the first coating is an adhesive layer and the second coating is a metal layer.

It is a feature of the protective cover of the invention that it is, in particular, compatible with paint and corrosion-resistant. On account of the adhesive layer, it has high adhesion and is watertight.

Especially if the flame-retardant fabric is a flame-retardant glass weave, and/or the first coating is an acrylic adhesive layer, and/or the second coating is an aluminum coating, and preferably if the main body is accommodated in particular directly between the first coating and the second coating, it is flame-retardant, and it has a holding power of more than 6 min at 1000° C. Furthermore, it can be applied in an automated manner, which results in inexpensive manufacture of the motor vehicle body.

BRIEF DESCRIPTION OF THE DRAWINGS

Further advantages, features and details of the invention will be apparent from the description of preferred working examples that follows, and from the drawing. The features and combinations of features specified above in the description and the features and combinations of features specified hereinafter in the description of figures and/or shown in the figures alone are usable not just in the particular combination specified but also in other combinations or on their own without leaving the scope of the invention. Elements that are the same or have the same function are assigned identical reference numerals. For reasons of clarity, it is possible that the elements are not given their reference numeral in all FIGS., but do not lose their assignment. The figures show.

DETAILED DESCRIPTION OF THE INVENTION

Figure 1:
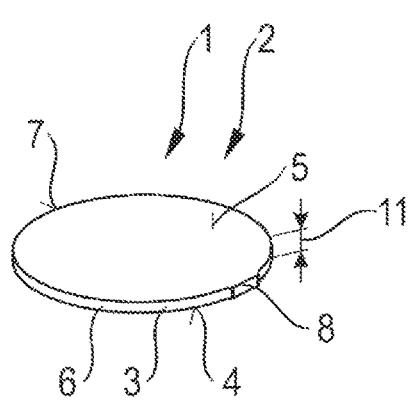
FIG. 1 a perspective view of a protective cover of the invention for a motor vehicle body in a first working example, FIG. 2 a perspective view of the protective cover of the invention for a motor vehicle body in a second working example, FIG. 3 a perspective view of the protective cover of the invention for a motor vehicle body in a third working example, and FIG. 4 a perspective view of the protective cover of the invention for a motor vehicle body in a fourth working example.

An inventive protective cover 1 for a motor vehicle body 2 is designed according to FIGS. 1 to 4.

The protective cover 1, which can also be referred to as protective pad or heat protection pad or sealing cap, serves to cover an opening, not shown in detail, which is formed in the motor vehicle body 2, preferably establishing a flush arrangement with a body surface, not shown in detail, of the motor vehicle body 2 that surrounds the opening. It would thus be possible, for example, for a fusebox, not shown in detail, which is arranged within the motor vehicle body 2 to have coverage with the protective cover 1 for prevention of visibility of the fusebox from an interior of the motor vehicle body 2. However, numerous arrangements of the protective cover 1 in the motor vehicle body 2 are conceivable.

The protective cover 1 fundamentally takes the form of a plate or disk, especially having a low thickness 11. It has a main body 3 formed from a flame-retardant glass weave. The main body 3 is formed between a first coating 4 and a second coating 5, with the first coating 4 in the form of an adhesive layer, preferably an acrylic adhesive layer 4, and the second coating 5 being a metal coating, preferably an aluminum coating. Since the main body 3 is a fabric, it will be apparent that the coatings 4, 5 are also disposed at least in one edge region 6 of the main body 3.

Figure 2:
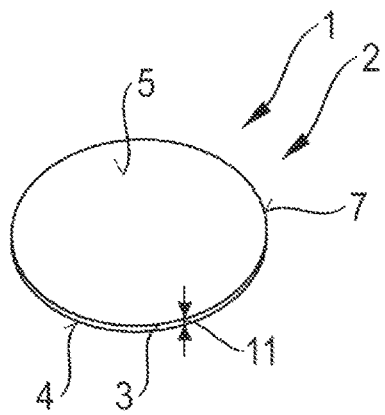

In a first working example according to FIG. 1 and a second working example according to FIG. 2, the protective cover 1 has a round outline 7, with this round outline 7 of the protective cover 1 according to the first working example being interrupted by two projections 8.

Figure 3:
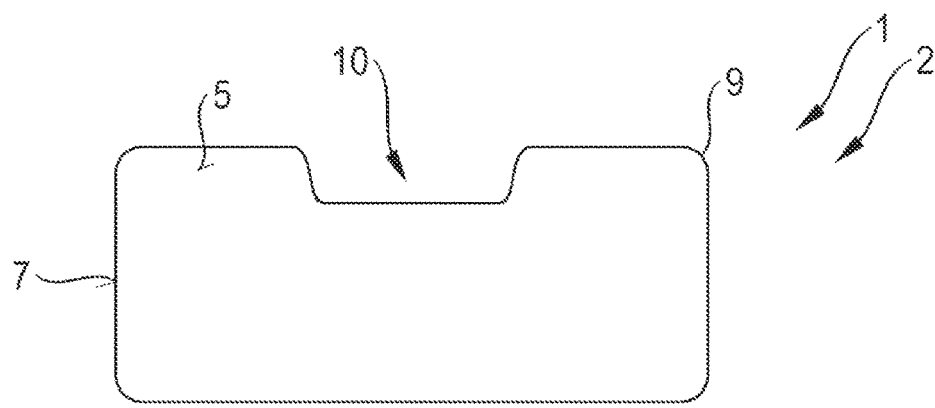
Figure 4:
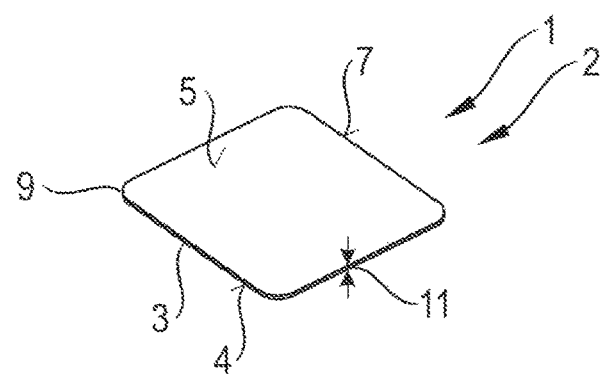

In a third working example according to FIG. 3 and a fourth working example according to FIG. 4, the protective cover 1 has an essentially rectangular or square outline 7 having rounded edges 9. It would likewise be possible for the edges 9 to be in sharp-edged form.

The protective cover 1 in the third working example has an indentation 10 that interrupts the rectangular outline 7. In principle, the protective cover 1 may also have an outline 7 different from the outlines 7 depicted by way of example.

LIST OF REFERENCE NUMERALS 1 protective cover
2 motor vehicle body
3 main body
4 first coating
5 second coating
6 edge region
7 outline
8 projection
9 edge
10 indentation
11 thickness

What is claimed is:

1. A protective cover for a motor vehicle, said protective cover consisting of:
    a main body that is configured to be mounted over an opening defined in the motor vehicle, wherein the main body consists of a flame-retardant fabric having a first surface and a second surface that is opposite the first surface,
    a first coating disposed on the first surface, wherein the first coating is an adhesive coating disposed directly on, and in direct contact with, the first surface of the flame-retardant fabric, and
    a second coating disposed on the second surface, wherein the second coating is a metal layer disposed directly on, and in direct contact with, the second surface of the flame-retardant fabric,
    wherein no additional layers are arranged between the adhesive coating and the first surface of the flame-retardant fabric, wherein no additional layers are arranged between the metal layer and the second surface of the flame-retardant fabric, and wherein no additional layers are arranged on a surface of the metal layer that is opposite the second surface of the flame-retardant fabric, and
    wherein the main body includes an edge extending between the first and second surfaces of the main body, wherein the first coating and the second coating are at least partially disposed on the edge of the main body at a location between the first and second surfaces of the main body, respectively.

2. The protective cover as claimed in claim 1, wherein the flame-retardant fabric is a flame-retardant glass weave.

3. The protective cover as claimed in claim 1, wherein the first coating is an acrylic adhesive layer.

4. The protective cover as claimed in claim 1, wherein the second coating is an aluminum coating.

5. The protective cover as claimed in claim 1, further comprising an indent formed on a perimeter of the main body.

6. The protective cover as claimed in claim 1, further comprising an outwardly extending projection formed on a perimeter of the main body.

7. A fusebox including the protective cover as claimed in claim 1.

8. A motor vehicle and the protective cover as claimed in claim 1, wherein the opening is formed in an interior compartment of the motor vehicle and the protective cover covers the opening.

9. A protective cover for a motor vehicle, said protective cover consisting of:
    a main body that is configured to be mounted over an opening defined in the motor vehicle, wherein the main body consists of a flame-retardant glass weave having a first surface and a second surface that is opposite the first surface,
    an acrylic adhesive coating disposed directly on, and in direct contact with, the first surface, and
    an aluminum coating disposed directly on, and in direct contact with, the second surface,
    wherein no additional layers are arranged between the acrylic adhesive coating and the first surface of the flame-retardant glass weave, wherein no additional layers are arranged between the aluminum coating and the second surface of the flame-retardant glass weave, and wherein no additional layers are arranged on a surface of the aluminum coating that is opposite the second surface of the flame-retardant fabric, and
    wherein the main body includes an edge extending between the first and second surfaces of the main body, wherein the first coating and the second coating are at least partially disposed on the edge of the main body at a location between the first and second surfaces of the main body, respectively.

* * * * *